Patented July 5, 1932

1,866,025

UNITED STATES PATENT OFFICE

LEON W. GELLER, OF SYRACUSE, NEW YORK, ASSIGNOR TO WILL & BAUMER CANDLE COMPANY, INC., OF SYRACUSE, NEW YORK, A CORPORATION OF NEW YORK

MOLDING OF BEESWAX CANDLES AND THE PRODUCT THEREOF

No Drawing.    Application filed May 6, 1931.   Serial No. 535,571.

This invention relates to certain new and useful improvements in molding of beeswax candles and the product thereof.

It is a fact that a stock containing forty or more percent beeswax can not be molded on account of its adherence to the molds. The formed beeswax candle sticks to the mold and the finished product in the machine can not be removed or taken out.

I have discovered a method by means of which beeswax candles can be practically and commercially molded and have carried out such process and have produced a novel and improved product in the form of a molded beeswax candle.

My discovery resides in the fact that I have found that an improved product is produced by the use of the improved process which comprises the molding of beeswax in combination with:

1. Aliphatic dihydric alcohols, glycols, and their homologues.
2. Derivatives of aliphatic dihydric alcohols, glycols, and their homologues.

When so combined, the beeswax stock can be readily and easily molded into candles and readily and easily removed from the molds in a commercial practice.

For the purpose of this disclosure, the following may be considered as examples of aliphatic dihydric alcohols, glycols and their homologues.

1. Ethylene glycol $(CH_2)_2\begin{subarray}{l}OH\\OH\end{subarray}$
2. Trimethylene glycol $(CH_2)_3\begin{subarray}{l}OH\\OH\end{subarray}$
3. Tetramethylene glycol $(CH_2)_4\begin{subarray}{l}OH\\OH\end{subarray}$
4. Penta methylene glycol $(CH_2)_5\begin{subarray}{l}OH\\OH\end{subarray}$
5. Hexa methylene glycol $(CH_2)_6\begin{subarray}{l}OH\\OH\end{subarray}$
6. Octo methylene glycol $(CH_2)_8\begin{subarray}{l}OH\\OH\end{subarray}$—etc.
7. a-Propylene glycol $CH_3CH(OH)CH_2OH$
8. Unsymmetrical dimethyl ethylene glycol $(CH_3)_2C(OH)CH_2(OH)$
9. a-Isoamylene glycol $(CH_3)_2CH.CH(OH)CH_2OH$
10. b-Isoamylene glycol $(CH_3)_2C(OH)CH(OH)CH_3$
11. b-Amylene glycol $C_2H_5CH(OH)CH(OH)CH_3$ For the purpose of this disclosure, the following may be considered as derivatives of aliphatic dihydric alcohols, glycols, and their homologues:

A. Glycolates

Sodium, potassium glycolate

B. Polyethylene glycols such as:

Diethylene glycol

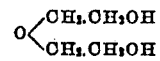

Triethylene glycol

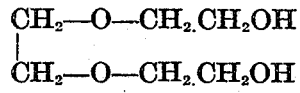

Tetroethylene glycol

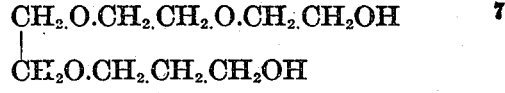

Pentaethylene glycol

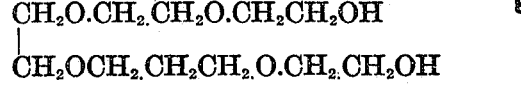

etc.

C. Ethers such as:

Diethylene glycol monoethyl ether

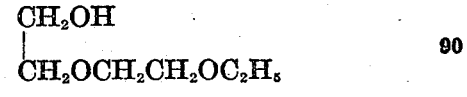

Ethylene glycol butylether

Penta methylene glycol ethyl ether

D. *Cyclic ethers of glycols* such as:

Diethylene oxide $\quad$ $CH_2O-CH_2$
$\qquad\qquad\qquad\qquad\quad |\qquad\quad |$
$\qquad\qquad\qquad\qquad\;\; CHO-CH_2$ E. *Halogen esters* such as:

Ethylene chlorhydrin $\quad CH_2CL$
$\qquad\qquad\qquad\qquad\qquad\;\; |$
$\qquad\qquad\qquad\qquad\quad CH_2OH$ F. *Carboxylic acids esters* for example,

Glycol monoacetate $\quad CH_2OH$
$\qquad\qquad\qquad\qquad\quad\; |$
$\qquad\qquad\qquad\qquad CH_2OCOCH_3$ G. *Esters of glycol ethers* for example,

Acetic ester of ethylene glycol amyl ether $\qquad\qquad CH_2O.C_5H_{11}$
$\qquad\qquad\quad |$
$\qquad\qquad CH_2O.OCCH_3$ As an example of a suitable formula utilizing an aliphatic dihydric alcohol, the following is found satisfactory:

To a mixture which contains ninety parts of 100% beeswax, five parts paraffine and four parts stearic acid is added one part triethylene glycol.

The mixture of substance described is heated and the constituent materials uniformly distributed and the hot mixture is then poured into the mold, and after about thirty minutes of cooling the machine is raised in the usual manner and the candles are taken out.

As an illustration of a suitable mixture comprising a derivative of aliphatic dihydric alcohol, the following may be taken as satisfactory:

To a mixture which contains eighty-five parts of 100% beeswax, five parts paraffine, five parts stearic acid, one part Montan wax, there is added four parts tetra-ethylene glycol monoethyl ether.

The mixture is heated and the constituent elements uniformly distributed throughout and the melted hot stock is poured into the mold, and after about thirty minutes of cooling, the machine is raised in the usual manner and the candles are taken out.

Although I have herein described specific examples as illustrative of embodiments of the invention, I do not desire to restrict myself to the same, as any of the materials specifically set forth herein may be utilized, and various proportions of the constituent elements may be selected.

Further the combination of compounds formed may include in addition to beeswax stock, any kind of animal, vegetable, mineral or synthetic waxes or stearic acid and which although they form no portion of the present invention, may be used to reduce the beeswax content of the candles or improve their burning properties or their physical appearance.

Further, the expression "aliphatic dihydric alcohol" as used in the claims hereof, is deemed to include homologues.

I claim:

1. A molded candle containing a substantial percentage of beeswax, and an aliphatic dihydric alcohol.

2. A molded candle containing forty or more percent of beeswax, and an aliphatic dihydric alcohol.

3. A molded candle containing a substantial percentage of beeswax, and a derivative of an aliphatic dihydric alcohol.

4. A molded candle containing forty or more percent of beeswax, and a derivative of an aliphatic dihydric alcohol.

In witness whereof I have hereunto set my hand this 18 day of April, 1931.

LEON W. GELLER.